3,029,129
CATALYTIC CONVERSION OF HEXAVALENT URANIUM TO URANIUM TETRAFLUORIDE
Robert V. Townend, Morris Township, Morris County, and John E. Wilkalis, Morris Plains, N.J., assignors to Allied Chemical Corporation, New York, N.Y., a corporation of New York
No Drawing. Filed Feb. 11, 1960, Ser. No. 7,980
4 Claims. (Cl. 23—14.5)

This invention relates to the production of uranium tetrafluoride and more particularly refers to a new and improved process for the conversion of uranium compounds containing hexavalent uranium to uranium tetrafluoride compounds.

In theory uranyl ion may be reduced with $SO_2$ and in the presence of HF produce uranium tetrafluoride. This theoretical over-all reaction is exemplified by the equation below:

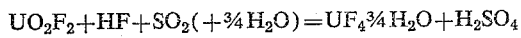

$$UO_2F_2 + HF + SO_2 (+ \frac{3}{4} H_2O) = UF_4 \cdot \frac{3}{4} H_2O + H_2SO_4$$

Unfortunately, reduction and reaction as exemplified by the above equation will not normally occur. Although extensive experimentation was carried out in an effort to obtain this reaction, only one method was found, as more fully described in an article entitled "Precipitation of Uranium Tetrafluoride From Aqueous Solution by Catalytic Reduction," in Industrial and Engineering Chemistry, vol 50, pages 1748–9, December 1958, by Allen, Petrow and Magno of the National Lead Co. Inc. In the process of the article reduction and precipitation was carried out at temperatures from 25 to 100° C. using copper chloride as a catalyst by bubbling $SO_2$ gas through the solution. The presence of chloride ion according to the article is essential to effect the reaction and as stated therein page 1749, "Reduction of cupric ion will not take place in the absence of chloride . . . ." From a commercial standpoint, the presence of chlorides in the solution is highly objectionable because of corrosion effects. These are aggravated by increased temperature and acidity. Further the induction period using copper chloride is rather long, of the order of 2 or more hours as shown by the article. In addition, the reaction rate is relatively slow unless large amounts of copper chloride catalyst are employed which increases the cost and complicates the operation.

One object of the present invention is to provide an efficient, economical method for reduction of uranium compounds containing hexavalent uranium and precipitation of uranium tetrafluoride compounds.

Another object of the present invention is to provide a method for reducing uranyl ion and precipitating uranium tetrafluoride compound in the absence of chloride ion.

A further object of this invention is to provide a method for reducing uranyl ion and precipitating uranium tetrafluoride compound with materially shortened induction period and increased rate of reaction.

Other objects and advantages of the present invention will be apparent from the following description.

In accordance with the present invention rapid and substantially complete reduction of uranyl ion in aqueous solution may be accomplished by reacting said uranyl ion with $SO_2$ and HF at an elevated temperature above 100° C. preferably above 110° C. and below 275° C., desirably within the range of 125–175° C. and under super-atmospheric pressure above 40 p.s.i.a. preferably within the range of 50–250 p.s.i.a. and in the presence of a catalyst selected from the group consisting of copper fluoride and copper sulfate.

The reaction may be carried out in a metal vessel preferably stainless steel surrounded by a heating means which may take the form of an electrical heating element or a jacket through which a heating fluid such as diphenyl or steam is passed. With the interior of the vessel lined with lead to resist corrosion, agitation of the contents in the reaction vessel may be accomplished by any suitable means. In practice we have found it convenient to effect stirring by means of a Teflon-coated magnet in the reaction chamber and a large horse-shoe magnet attached to the stirring motor. It is advisable to use corrosion resistant gaskets such as Teflon when sealing the top of the reaction vessel. Tubes entering the reaction chamber for introduction of the reactants and for use as a thermal well to determine the temperature may be constructed of Teflon. The reaction vessel is provided with the usual pressure gauge and relief valve as is conventional. The reaction vessel may also be lined with Teflon as a corrosion resistant material but as a practical matter in commercial operation a lead lining is preferred. In carrying out the process of the present invention in commercial operation lead lined reaction vessels were found to satisfactorily resist corrosion. However, the presence of chloride ion in lead lined reaction chambers causes attack on the lead lining and creates a corrosion problem. Consequently, chloride ion is deleterious material and should be avoided. It was noted that the presence of a small amount of sulfuric acid in the reaction mixture tended to minimize corrosion and did not interfere with the reaction. However, a large excess of sulfuric acid i.e. an amount in excess of 10% by weight of the solution of $H_2SO_4$ tended to retard the rate of reaction and therefore the amount of sulfuric acid should desirably be kept below 10%.

The starting material may be any compound containing a uranyl ion such as uranyl fluoride and uranyl sulfate. A common source of the charging material is leach liquors from uraniferous ores as described in the Industrial and Engineering Chemistry article previously referred to. In the treatment of various uranium containing ores there are produced "concentrates" in which the uranium content in hexavalent form ranges up to about 75% by weight of the concentrate which are also suitable for treatment in accordance with the present invention. In addition, in the production of uranium hexafluoride there is produced impure $UF_6$ as for example still rejects which do not meet specification $UF_6$. Such contaminated $UF_6$ is also suitable for treatment in the present process by reacting it with water to give $UO_2F_2$. This can be done in the $SO_2$ reaction vessel if desired.

The reaction may be carried out by introducing the hexavalent uranium compound, ore, contaminated $UF_6$ or both, water in an amount to provide an aqueous solution of the uranyl compound, generally in excess of about 30 mols water per mol of uranyl ion, hydrofluoric acid in stoichiometric excess of that required to react with the uranium and a small amount of copper catalysts as defined in the present invention. Although the reaction works well with a minor stoichiometric excess of HF, a few percent, we have found that a larger excess of HF tends to effect more complete precipitation. While large amounts of HF will not interfere with the reaction, nevertheless the use of large excesses of HF is wasteful and in practice we have found that a mol ratio of HF to uranium within the range of about 4.5 to about 7 gives satisfactory results. The catalyst may be conveniently added to the reaction mixture as copper fluoride or copper sulfate or may be formed in situ by reaction of hydrofluoric acid or sulfuric acid in the reaction mixture with a copper ion as for example copper hydroxide, copper carbonate or copper oxide which will react with the acids to form copper fluoride or copper sulfate. The amount of catalyst which need be employed is quite small and in terms of ratio of copper to uranium may be as low as 0.0002 and as high as 0.05 or higher. Good results were obtained with a copper/uranium ratio within the range of 0.001 to 0.03. While larger amounts of copper catalyst may be employed no material benefits are obtained thereby and substantially smaller amounts of copper tend to cause a longer reaction time.

The reactants composed of the charging uranyl material such as uranyl fluoride or uranyl sulfate, water, hydrofluoric acid and copper sulfate are then heated to about the desired reaction temperature above 110° C. $SO_2$ gas under pressure is introduced into the reactants in the closed reaction chamber and the pressure maintained at the desired superatmospheric pressure above 50 p.s.i.a. The introduction of the $SO_2$ gas to build up the required pressure is a matter of just a few minutes. Conditions of high temperature above 100° C. and superatmospheric pressure above 40 p.s.i.a. were found necessary to obtain beneficial results of the present invention. It was noted that the reaction started almost instantaneously and long induction periods were not required and did not occur. To determine when the reaction is completed, the reaction vessel is equipped with a sample line through which samples of the reaction may be withdrawn periodically. Almost complete precipitation i.e. more than 99% of the uranium can be reacted in a period of less than 2 hours and indeed often the reaction was completed in less than about ½ hour.

At the end of the reaction, pressure is released and the contents of the reaction vessel cooled. The reaction products are a slurry of the precipitate of uranium tetrafluoride compound ordinarily in the form of a hydrate $UF_4 \cdot \tfrac{3}{4} H_2O$ which is filtered and the filter cake may then be dried by heating in a furnace at about 110° C. Sometimes the starting material containing the hexavalent uranium may contain ammonium salts in which event the precipitate may consist partly or entirely of the complex $UF_4 \cdot NH_4F$ depending on the amount of ammonium salts which occur in the concentrate used. This complex is readily decomposable and upon heating to a temperature of about 300° C. will produce uranium tetrafluoride.

The following examples illustrate the present invention.

*Example 1*

The uranium charging material was a concentrate blend of material from the following sources: 50% Kermac, 30% Texas Zinc, 10% Rare Metals and 10% Dawn Mining. Into a reaction chamber was charged the concentrate, a small amount of sulfuric acid, 60% hydrofluoric acid, water and a small amount of catalyst in the form of $CuSO_4 \cdot 5H_2O$. The analysis of this reaction mixture was as follows:

| | Percent by weight |
|---|---|
| Concentration of $U^{+6}$ | 20.0 |
| Concentration of $SO_4$ | 0.24 |
| Concentration of Cu | 0.16 |
| HF/U mol ratio | 4.8 |

The reaction products were heated to a temperature of about 140° C. thereafter $SO_2$ gas under pressure was introduced into the reaction vessel until the pressure reached 125 p.s.i.a. and maintained at that pressure. At the end of 1½ hours 99.8% of the $U^{+6}$ charging material was reacted and precipitated out as uranium tetrafluoride hydrate. This uranium tetrafluoride hydrate precipitate in the reaction mixture was separated by filtration and dried.

*Example 2*

In this example the operation is carried out in a manner similar to that of Example 1 except that the initial reaction mixture had the following analysis:

| | Percent by weight |
|---|---|
| Concentration of $U^{+6}$ | 20.0 |
| Concentration of $SO_4$ | 0.72 |
| Concentration of Cu | 0.48 |
| HF/U mol ratio | 4.8 |

Also the temperature of reaction was 155° C. and the pressure was 142 p.s.i.a. At the end of 30 minutes 99.65% of the $U^{+6}$ in the reaction mixture was reacted. At the end of 45 minutes 99.94% of the $U^{+6}$ was reacted. The $UF_4$ in the reaction mixture was separated by filtration and dried.

*Example 3*

The operation in this example is similar to that of Example 1 except that the charging material was hydrolyzed $UF_6$ concentrate and the reaction mixture had the following analysis:

| | Percent by weight |
|---|---|
| Concentration of $U^{+6}$ | 18.9 |
| Concentration of $SO_4$ | 0.57 |
| Concentration of Cu | 0.48 |
| HF/U mol ratio | 5.8 |

The temperature of the reaction was 139° C. and the pressure was 92 p.s.i.a. At the end of 1¾ hours 99.79% of the $U^{+6}$ in the initial reaction mixture was reacted. The uranium tetrafluoride hydrate precipitate was separated by filtration and dried at 110° C.

*Example 4*

The operation in this example is similar to Example 1 but differed particularly in that $CuF_2$ was used as a catalyst. The charge to the reaction vessel was 175 parts by weight of $UO_2F_2$ aqueous solution containing 42 parts uranium; 130 parts by weight water; 17 parts by weight HF and 2 parts by weight $CuF_2$. The reaction mixture was heated to 112° C. and $SO_2$ gas was introduced into the reaction vessel to produce a pressure of 57 p.s.i.a. At the end of 2½ hours the pressure was released slowly and the uranium tetrafluoride hydrate precipitated as a result of the reaction was filtered. The filter cake was dried at 110° C. and constituted 57.57 parts by weight dried $UF_4 \cdot \tfrac{3}{4} H_2O$. The filtrate was analyzed and showed that it contained less than 0.02% uranium.

Although certain preferred embodiments of the invention have been disclosed for purpose of illustration, it will be evident that various changes and modifications may be made therein without departing from the scope and spirit of the invention.

We claim:

1. In a process for the conversion of uranium compounds containing hexavalent uranium by reduction with $SO_2$ and reaction with HF to produce uranium tetrafluoride compound, the improvement which comprises effecting said reaction in the absence of chloride ions under superatmospheric pressure above 40 p.s.i.a. and at a temperature above 100° C. in the presence of a catalyst selected from the group consisting of copper fluoride and copper sulfate.

2. In a process for the conversion of uranium compounds containing hexavalent uranium by reduction with $SO_2$ and reaction with HF to produce uranium tetrafluoride compound, the improvement which comprises effecting said reaction in the absence of chloride ions under superatmospheric pressure within the range of 50–250 p.s.i.a. and at a temperature within the range of 110° to 275° C. in the presence of a catalyst selected from the group consisting of copper fluoride and copper sulfate.

3. In a process for the conversion of uranium compounds containing hexavalent uranium by reduction with $SO_2$ and reaction with HF to produce uranium tetrafluoride compound, the improvement which comprises effecting said reaction in the absence of chloride ions under superatmospheric pressure within the range of 50–250 p.s.i.a. and at a temperature within the range of 125° to 175° C. in the presence of copper fluoride as a catalyst.

4. In a process for the conversion of uranium compounds containing hexavalent uranium by reduction with $SO_2$ and reaction with HF to produce uranium tetrafluoride compound, the improvement which comprises effecting said reaction in the absence of chloride ions under superatmospheric pressure within the range of 50–250 p.s.i.a. and at a temperature within the range of 125° to 175° C. in the presence of copper sulfate as a catalyst.

References Cited in the file of this patent

WIN–90, Petrow, et al., May 15, 1958, Div. 46 AEC Document, pp. 5, 8–12, 18–21, 27–32, Technical Inform. Service Extension, Oak Ridge, Tenn.

Industrial & Engineering Chemistry 50, December 1958, No. 12 pp. 1748, 1749.